(12) United States Patent
Omer (10) Patent No.: US 12,254,444 B2
(45) Date of Patent: *Mar. 18, 2025

(54) SYSTEM AND METHOD TO ATTRIBUTE EXPIRATION DATES AND QUANTITIES OF A PRODUCT TO A SKU CODE FOR PRICING PURPOSES

(71) Applicant: WASTELESS LTD., Tel Aviv (IL)

(72) Inventor: Oded Omer, Holon (IL)

(73) Assignee: WASTELESS LTD., Tel Aviv (IL)

( * ) Notice: Subject to any disclaimer, the term of this patent is extended or adjusted under 35 U.S.C. 154(b) by 23 days.

This patent is subject to a terminal disclaimer.

(21) Appl. No.: 17/573,758

(22) Filed: Jan. 12, 2022

(65) Prior Publication Data

US 2022/0129839 A1  Apr. 28, 2022

Related U.S. Application Data

(63) Continuation-in-part of application No. 16/761,402, filed as application No. PCT/IB2018/058679 on Nov. 5, 2018, now Pat. No. 11,257,133.

(60) Provisional application No. 62/581,712, filed on Nov. 5, 2017.

(51) Int. Cl.
*G06Q 30/02* (2023.01)
*G06Q 10/087* (2023.01)
*G06Q 20/20* (2012.01)
*G09F 3/20* (2006.01)

(52) U.S. Cl.
CPC ......... *G06Q 10/087* (2013.01); *G06Q 20/201* (2013.01); *G06Q 20/202* (2013.01); *G09F 3/208* (2013.01)

(58) Field of Classification Search
CPC .............. G06Q 10/087; G06Q 20/201; G06Q 20/202; G06Q 20/085; G09F 3/208
USPC .......................................................... 705/20
See application file for complete search history.

(56) References Cited

U.S. PATENT DOCUMENTS

| | | | | |
|---|---|---|---|---|
| 7,185,810 B2* | 3/2007 | White | .................. | G06Q 10/087 705/28 |
| 8,321,302 B2* | 11/2012 | Bauer | ...................... | H01Q 7/00 705/28 |
| 10,068,241 B2* | 9/2018 | Nayak | .................. | G06Q 10/087 |
| 2002/0116267 A1* | 8/2002 | Weisz | ................ | G06Q 30/0207 705/14.1 |
| 2006/0277109 A1* | 12/2006 | Kerth | .................. | G06Q 20/4016 705/20 |
| 2011/0285765 A1* | 11/2011 | Lamontagne | .......... | H02J 7/0042 347/3 |
| 2013/0086114 A1* | 4/2013 | Wilson | .................... | G06F 16/27 707/783 |
| 2014/0304123 A1* | 10/2014 | Schwartz | .............. | G06Q 10/087 705/28 |
| 2015/0134403 A1* | 5/2015 | Schwartz | ............ | G06Q 30/0623 705/7.29 |
| 2015/0242168 A1* | 8/2015 | Yu | .......................... | G06F 3/1203 358/1.13 |

(Continued)

*Primary Examiner* — Russell S Glass
(74) *Attorney, Agent, or Firm* — Gearhart Law, LLC (57) ABSTRACT

A system and method to attribute expiration dates and quantities of a product to an SKU code for pricing purposes. This method applies dynamic pricing to perishable food items. Using bulk tagging capabilities, the supermarket can attribute expiration dates to items without the pain of actually tagging the items with stickers.

18 Claims, 4 Drawing Sheets

(56) References Cited

U.S. PATENT DOCUMENTS

| | | | |
|---|---|---|---|
| 2015/0317667 A1* | 11/2015 | Wohlert | G06Q 30/0643 |
| | | | 705/14.35 |
| 2016/0217447 A1* | 7/2016 | Sarkar | G06Q 30/0283 |
| 2018/0137521 A1* | 5/2018 | Norby | G06Q 30/0201 |
| 2019/0057409 A1* | 2/2019 | Omer | G06K 7/10237 |
| 2019/0272574 A1* | 9/2019 | Bahnsen | G06Q 30/0623 |
| 2020/0050813 A1* | 2/2020 | Bonner | G06F 9/542 |

* cited by examiner

SYSTEM AND METHOD TO ATTRIBUTE EXPIRATION DATES AND QUANTITIES OF A PRODUCT TO A SKU CODE FOR PRICING PURPOSES

CROSS-REFERENCE TO RELATED APPLICATIONS SECTION

This application is a U.S. Non-Provisional patent application and Continuation-in-Part (CIP) patent application of U.S. Non-Provisional patent application Ser. No. 16/761,402 filed on May 4, 2020, which is a National Stage Entry of PCT/IB2018/058679 filed on Nov. 5, 2018 and which claims priority to U.S. Provisional Patent Application Ser. 62/581,712 filed on Nov. 5, 2017, the entire contents of which are hereby incorporated by reference in their entirety.

FIELD OF THE EMBODIMENTS

The present invention relates to the ability to attribute one expiration date to multiple products have the same Store Keeping Unit (SKU). The supermarket employee will use his smart-phone or any hand-held device to identify the product (SKU), identify and attribute items quantity, and finally, attribute expiration date to the product. The data generated with this portable device will then be transmitted to a local or remote server for further use of stock level management and in-store dynamic pricing application. A detailed flow and description can be found further on this application.

BACKGROUND OF THE EMBODIMENTS

The need for such method emerged from a real day-to-day problem exist in supermarket—product tagging. Basically, since existing barcodes usually carries no meta data beside product name and price, additional tagging is needed in many occurrences for the purpose of specific identification, for example, for discount, or waste tracking. When such occurrences happen, a supermarket employee needs to add additional tag or sticker carry more data and this is done manually.

SUMMARY OF THE EMBODIMENTS

The present application disclosed a system and a method for avoiding food waste, comprising: a scanner, the scanner able to read data on a barcode on a plurality of consumer products; a portable device; a processor having a memory, the memory having computer readable instructions stored thereon that when executed by the processor, receiving the data received from the scanner; displaying the data on a screen of the portable device; determining, via a processor, an expiration date of the consumer product; calculating, via a processor, a dynamic price based on the expiration date and data received from the bar code of the consumer product; and approving, via a processor, the data displayed on the portable device screen.

The present application's system and method further comprises a scanner comprised of at least one of a smart phone or any portable device. The present application further comprises, wherein the data is comprised of at least one of a picture of the consumer product, quantity, price and expiration date of the consumer product. Data is transmitted from the portable device via Bluetooth, Wi-Fi or cellular communication. Data is stored on a local or remote server. The dynamic price is projected to in-store screens or electronic shelf labels (ESL). The dynamic price is communicated via a processor to a checkout cashier.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DESCRIPTION OF THE PREFERRED EMBODIMENTS

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The suggested system described herein contains a software that is being deployed on a smart phone or any portable computing device, the device herein must contain a barcode scanner or ability to scan barcode, a screen or touch screen and a communication module to send the data generated by the user via Bluetooth, Wi-Fi or mobile frequencies 3G/4G.

The assembly presented, is based on a novel approach to use a combination of supermarket employee's hand-held device, barcode reader, computing capabilities and wireless communication in order to attach expiration dates and quantity with stock that is being uploaded to store's shelves.

Use example: A supermarket employee just got a pallet full of products having the same SKU to the store. The employee uses the device to scan one of the products in the pallet, the barcode that was scanned retrieves product picture and typical quantity that should be included in this pallet. The employee approve the picture and quantity or has the ability to fix the data manually. Now, the employee enters product expiration date, this date will be applied to all of the products within the pallet and will be sent to the local/remote server.

Now, the server has stock level and stock expiration date, it will be used to dynamically change product prices according to their expiration dates. The suggested prices will be displayed using Electronic Shelf Label as it is commonly displayed today. The consumer then, can take a product that best match his/her willingness to pay and his/her needs.

While paying in a store cashier, every product that is applicable for a discount will send a popup message to the screen, presenting the optional 2 or 3 dates to choose from.

Figure 1:
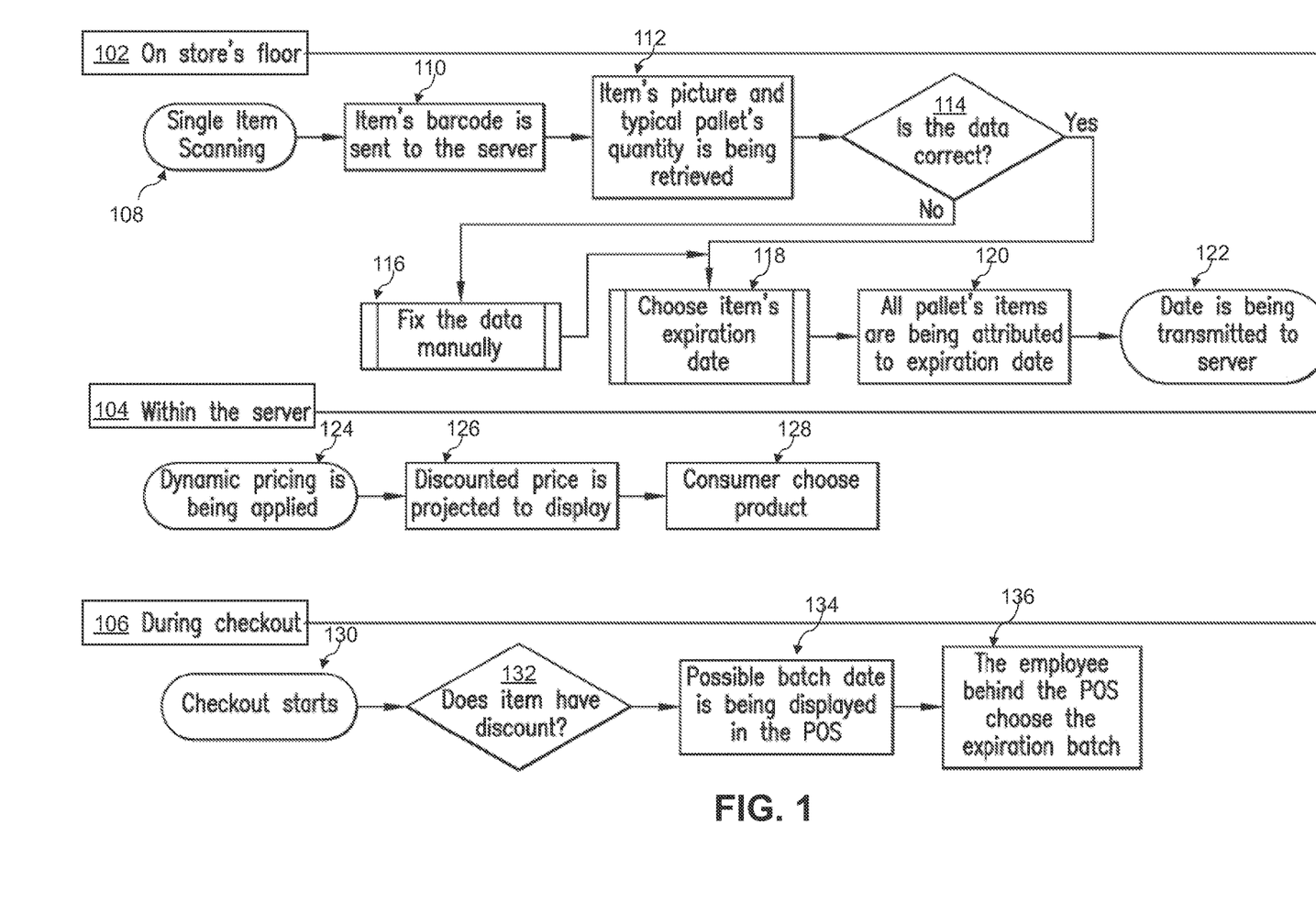
FIG. 1 illustrates the block diagrams of a system for a method to attribute expiration dates and quantities of a product to an SKU code for pricing purposes, in accordance with an embodiment of the invention.
Figure 2:
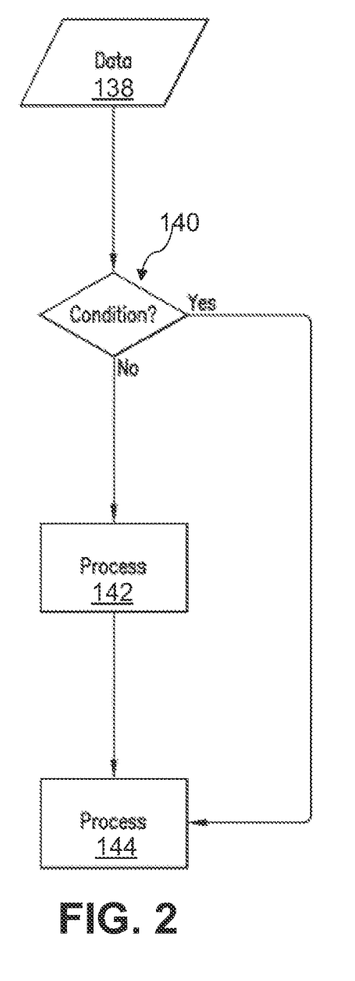
FIG. 2 illustrates a process flow of data in a system for a method to attribute expiration dates and quantities of a product to an SKU code for pricing purposes, in accordance with an embodiment of the invention.

Reference is made to FIG. 1 and FIG. 2, where FIG. 1 illustrates the system operational flow associated with actions that take place on the store's floor 102, actions that take place within the server 104, and actions that take place during checkout 106. The process steps of FIG. 1 are described below.

System Operational Flow Description

1. Single item scanning

Using smart phone or any portable device having the capabilities mentioned above, the store's employee scan one item from a pallet of items received at the store (e.g., a process step 108).

2. Data is being sent to server

The barcode that was retrieved from the scanning is being sent automatically to local or remote server in to retrieve item's picture and pallet common products quantity (e.g., a process step 110).

3. Data is being retrieved

The data that is being retrieved is displayed on portable device screen (e.g., a process step 112). Such data may include the items picture and typical pallet quantity. For example, the employee sees one pack of yogurt and suggested pallet quantity of 24 units.

4. Data integrity check

The employee can now approve the data received on the screen or fix quantity manually by using the touch screen (as shown in a process step 114, a process step 116, a process step 118, and in FIG. 2 as a process).

5. Expiration date is added

Following the process steps 108, 110, 112, 114, 116, and 118, the expiration dates are now added to the every SKU that was part of the product pallet received at the store (e.g., a process step 120).

6. Data is ready and submitted

The data is being transmitted from the portable device via Bluetooth, Wi-Fi or cellular communication to the local/remote server (e.g., a process step 122).

7. Data is used for dynamic pricing

The data that is now in the server, along with other key parameters, is used to dynamically price products according to their expiration dates (as shown in a process step 124 and FIG. 2 as a process).

8. Suggested price is being displayed

The suggested price for a product batch, having a specific expiration date, is being now projected to in-store screens or electronic shelf labels (ESL), as shown in a process step 126.

9. Consumer choose product

The consumer now can choose a product according it's pricing and expiration date, according to what he/she needs and as shown in a process step 128. The consumer will possibly pay less and food waste will be reduced.

10. Checkout process

During the checkout (e.g., a process step 130), an item's potential discount is automatically checked (e.g., a process step 132). If product SKU carries a discount within any of the batches that are currently on the shelves, a window popups to the screen forcing the cashier employee to choose the right expiration batch (e.g., a process step 134 and a process step 136).

11. Discount is being applied

Following the on-screen selection of the expiration batch, a discount to the item is being applied.

FIG. 2 further illustrates the need for certain conditions prior to certain system processes to be run. For example, FIG. 2 depicts data 138. The data 138 is subjected to a condition 140. If the condition 140 is met (e.g., a "yes" response), a process 144 occurs. If the condition 140 is not met (e.g., a "no" response), a process 142 occurs. As shown in FIG. 2, the system can predefine or users can define processes and conditions of the system and method of the present invention. This method is the missing part that is needed to apply dynamic pricing to perishable food items. Using this bulk tagging capability the supermarket can attribute expiration dates to items without the pain of actually tagging the items with stickers.

Figure 3:
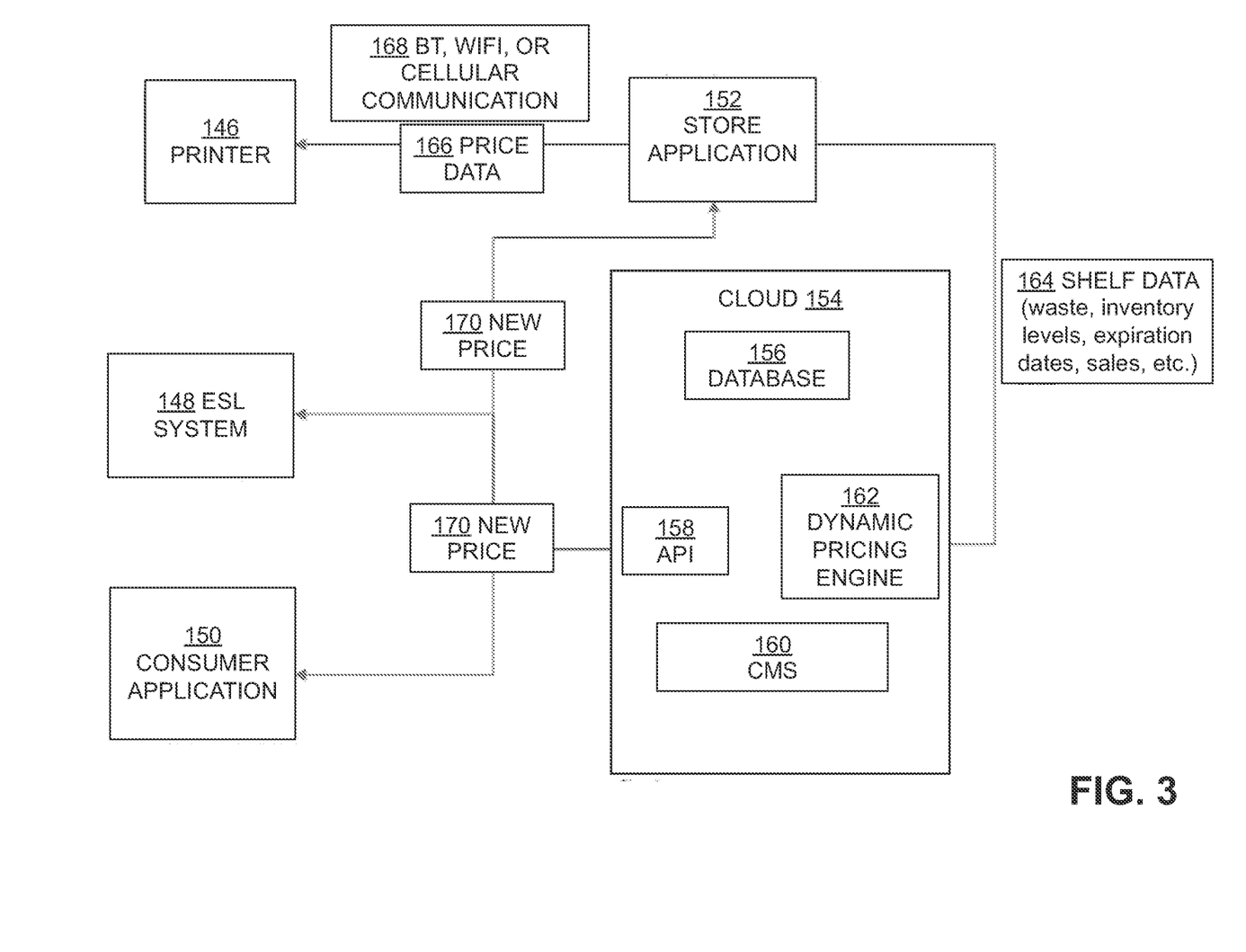
FIG. 3 illustrates a system, in accordance with an embodiment of the invention.

FIG. 3 depicts another schematic diagram of the system. The system generally includes cloud storage 154, a store application 152, an ESL system 148, a consumer application 150, and a printer 146. The cloud storage 154 includes a database 156, an application programming interface (API) 158, a dynamic pricing engine 162, and a Content Management System (CMS) module 160.

Figure 4:
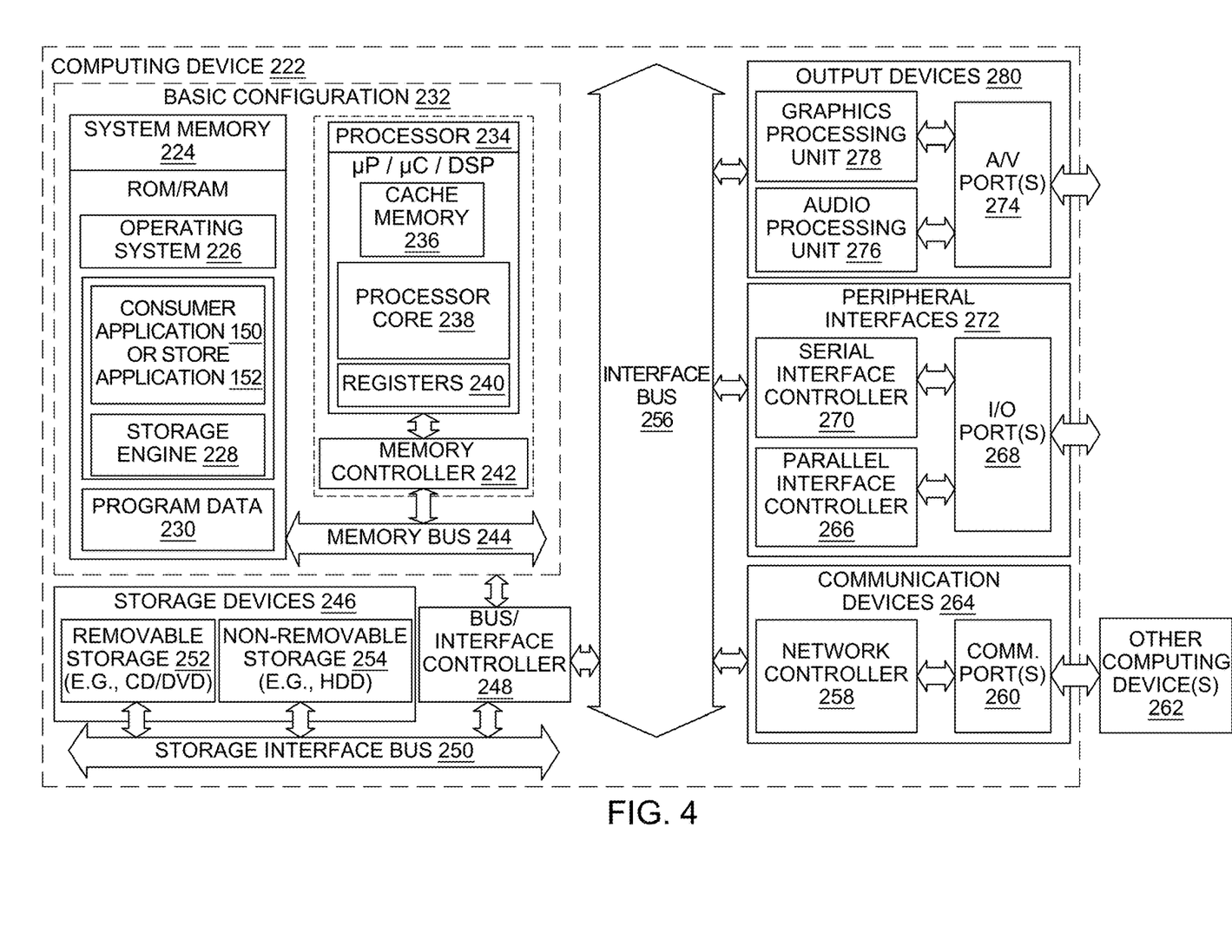
FIG. 4 is a block diagram of a computing device included within the computer system of FIG. 3, in accordance with an embodiment of the invention.

The store application 152 and the consumer application 150 may be executed on a first and a second computing device, respectively, such as a computing device 222 of FIG. 4. Each of the first and second computing device may be a computer, a laptop computer, a smartphone, and/or a tablet, among other examples not explicitly listed herein. Further, in some examples, one or each of the store application 152 and the consumer application 150 may alternatively be an engine, a software program, a service, or a software platform executable on the computing device 222 of FIG. 4.

As shown in FIG. 3, the store application 152 is configured to report shelf data 164, such as: waste, stock/inventory quantities, a products/goods catalog or SKU number, expiration dates, and sales of products to the cloud storage 154. The cloud storage 154 receives this information from the store application 152 and stores the shelf data 164.

The dynamic pricing engine 162 may assess the shelf data 164 for the product to determine a new price 170 for the product. In some examples, the new price 170 may be a discounted price for the product if the expiration date is close or approaching. This new price 170 for the product may be sent to the consumer application 150 and/or the ESL system 148.

Further, the store application 152 may transmit this price data 166 to a printer 146, which is configured to print a sticker or label associated with the discounted price. In examples, the sticker or label may comprise a readable identification tag, such as a Radio-Frequency Identification (RFID) tag, a barcode, a matrix barcode, and/or any data-enabled barcode, among others not explicitly listed herein.

The store application 152 may transmit this price data 166 to the printer 146 via a communication method, such as: a Bluetooth method, a Bluetooth Low Energy (LE) method, a WIFI method, or a cellular method. In the case of the Bluetooth method or the Bluetooth LE method, the printer 146 may comprise a receiver and the computing device on which the store application 152 is executed may comprise a transmitter.

As described herein, "Bluetooth Low Energy" is a wireless personal area network technology aimed at applications in the healthcare, fitness, beacons, security, and home entertainment industries. When compared to classic Bluetooth, Bluetooth LE is intended to provide considerably reduced power consumption and cost while maintaining a similar communication range.

FIG. 4 is a block diagram of a computing device included within the computer system of FIG. 3, in accordance with embodiments of the present invention. In some embodiments, the present invention may be a computer system, a method, and/or the computing device 222 (of FIG. 4). A basic configuration 232 of a computing device 222 is illustrated in FIG. 4 by those components within the inner dashed line. In the basic configuration 232 of the computing device 222, the computing device 222 includes a processor 234 and a system memory 224. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (µP), a microcontroller (µC), and a digital signal processor (DSP), or any combination thereof. Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an operating system 226, one or more engines or applications, such as the consumer application 150 and the store application 152, and program data 230. The system memory 224 may also include a storage engine 228 that may store any information disclosed herein.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system to attribute expiration dates and quantities of an item to a SKU code for pricing purposes, the system comprising:
    a portable device comprising a scanner that scans a barcode on one of a plurality of items, wherein each item shares a Store Keeping Unit (SKU), wherein the portable device is configured to:
        automatically transmit the barcode to a server;
        receive, from the server, data associated with the barcode;

display the data associated with the barcode on a screen of the portable device;

receive an input for the item from a user via the screen of the portable device, wherein the input comprises an expiration date for the item; and transmit the expiration date to the server, wherein the server updates each item sharing the SKU with the expiration date;

wherein the server calculates a new price for the item based on the expiration date, wherein the new price is attributable to each item sharing the SKU;

wherein the data associated with the barcode is transmitted from the server to at least one of a consumer application executed on a computing device and an electronic shelf label (ESL) system.

2. The system of claim 1, wherein the new price for the item is a discounted price for the item when the expiration date is close or approaching.

3. The system of claim 1, wherein the store application is further configured to transmit the new price of the item to a printer via a communication method.

4. The system of claim 3, wherein the printer is configured to print a sticker or label associated with the new price of the item.

5. The system of claim 4, wherein the sticker or label is affixed to the item, and wherein the sticker or label comprises a readable identification tag.

6. The system of claim 5, wherein the readable identification tag is selected from the group consisting of: a Radio-Frequency Identification (RFID) tag, a barcode, a matrix barcode, and a data-enabled barcode.

7. The system of claim 3, wherein the communication method is selected from the group consisting of: a Bluetooth method, a Bluetooth Low Energy (LE) method, a WIFI method, and a cellular method.

8. A method executed by a system to attribute expiration dates and quantities of an item to a SKU code for pricing purposes, the method comprising:

utilizing a scanner of a portable device to scan a barcode on one of a plurality of items, wherein each item shares a Store Keeping Unit (SKU);

automatically transmitting the barcode from the portable device to a server;

receiving, from the server, data associated with the barcode;

displaying the data associated with the barcode on a screen of the portable device;

receiving an input for the item from a user via the screen of the portable device, wherein the input comprises an expiration date for the item;

transmitting the expiration date to the server;

updating, by the server, each item sharing the SKU with the expiration date;

calculating, by the server, a new price for the item based on the expiration date, wherein the new price is attributable to each item sharing the SKU;

wherein the data associated with the barcode is transmitted from the server to at least one of a consumer application executed on a computing device and an electronic shelf label (ESL) system.

9. The method of claim 8, wherein the new price for the item is a discounted price for the product when the expiration date is close or approaching.

10. The method of claim 8, further comprising: transmitting, by the store application, the new price of the item to a printer via a communication method.

11. The method of claim 10, further comprising: printing, by the printer, a sticker or label associated with the new price of the item.

12. The method of claim 11, wherein the sticker or label is affixed to the item, and wherein the sticker or label comprises a readable identification tag.

13. The method of claim 12, wherein the readable identification tag is selected from the group consisting of: a Radio-Frequency Identification (RFID) tag, a barcode, a matrix barcode, and a data-enabled barcode.

14. The method of claim 10, wherein the communication method is selected from the group consisting of: a Bluetooth method, a Bluetooth Low Energy (LE) method, a WIFI method, and a cellular method.

15. The system of claim 1, wherein the portable device further comprises:

a store application executed on the portable device, the store application being configured to report shelf data associated with the item to the server, wherein the data associated with the barcode comprises: at least an image of the item, a quantity of the item, and a new price of the item.

16. The method of claim 8, wherein the portable device further comprises:

a store application executed on the portable device, the store application being configured to report shelf data associated with the item to the server, wherein the data associated with the barcode comprises: at least an image of the item, a quantity of the item, and a new price of the item.

17. The system of claim 14, wherein the portable device further comprises:

a store application executed on the portable device, the store application being configured to report shelf data associated with the item to the server, wherein the data associated with the barcode comprises: at least an image of the item, a quantity of the item, and a new price of the item.

18. The method of claim 15, wherein the portable device further comprises:

a store application executed on the portable device, the store application being configured to report shelf data associated with the item to the server, wherein the data associated with the barcode comprises: at least an image of the item, a quantity of the item, and a new price of the item.

* * * * *